(12) United States Patent
Maehara

(10) Patent No.: US 6,286,643 B1
(45) Date of Patent: Sep. 11, 2001

(54) PARKING BRAKE MECHANISM IN DRUM BRAKE

(75) Inventor: Toshifumi Maehara, Tokyo (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 0 days.

(21) Appl. No.: 09/800,587

(22) Filed: Mar. 8, 2001

(30) Foreign Application Priority Data

Mar. 13, 2000 (JP) .................................. 12-068896

(51) Int. Cl.[7] .................................................. F16D 51/00
(52) U.S. Cl. ........................................... 188/334; 188/331
(58) Field of Search ........................ 188/78, 325, 331, 188/334, 363, 364

(56) References Cited

U.S. PATENT DOCUMENTS

| | | | |
|---|---|---|---|
| 2,161,640 | * 6/1939 | Schnell | 188/334 |
| 3,349,875 | * 10/1967 | Stelzer | 188/331 |
| 3,941,218 | * 3/1976 | Torii | 188/331 |
| 4,768,631 | * 9/1988 | Heibel | 188/334 |
| 5,924,529 | * 7/1999 | Ikeda et al. | 188/331 |
| 6,059,077 | * 5/2000 | Maehara | 188/325 |
| 6,095,296 | * 8/2000 | Ikeda | 188/331 |
| 6,131,708 | * 10/2000 | Fujiwara | 188/250 E |
| 6,131,711 | * 10/2000 | Maehara | 188/331 |
| 6,186,294 | * 2/2001 | Maehara | 188/325 |

* cited by examiner

Primary Examiner—Christopher P. Schwartz
(74) Attorney, Agent, or Firm—Morgan, Lewis & Bockius LLP

(57) ABSTRACT

A parking brake mechanism in the duo-servo type drum brake includes a link type shoe drive mechanism for expanding a pair of brake shoes and an operating force generator for inputting a shoe operating force into an input lever of the shoe drive mechanism according to the brake operation. The parking brake mechanism also includes a parking brake lever pivotally supported by one brake shoe, wherein a shoe operating force is inputted into the input lever by swing of the parking brake lever, and the brake shoes are expanded via the shoe drive mechanism.

4 Claims, 3 Drawing Sheets

PARKING BRAKE MECHANISM IN DRUM BRAKE

BACKGROUND OF THE INVENTION

1. Field of the Invention

The present invention relates to a parking brake mechanism in a duo-servo type drum brake provided with a link type shoe drive mechanism, wherein a pushing force of the brake shoe to the drum is controlled according to an anchor reaction force so that the brake can be highly efficiently and stably applied. More particularly, the present invention relates to a parking brake mechanism for obtaining a parking brake function by a very small number of parts.

2. Description of the Related Art

Conventionally, there are provided various types of drum brakes for braking a running vehicle. According to the arrangement of the brake shoes pressed against an inner circumferential face of the substantially cylindrical drum, these drum brakes can be classified into a leading trailing type, two leading type and duo-servo type.

In general, the duo-servo type drum brake includes a pair of shoes composed of a primary shoe and secondary shoe which are arranged in the drum being opposed to each other.

Concerning the primary shoe, an entry side in the advancing rotational direction of the drum is an input section, and a delivery side in the advancing rotational direction of the drum is connected with an entry side of the secondary shoe via, for example, an adjuster. On the other hand, a delivery side of the secondary shoe is contacted with an anchor section provided on a backing plate. Therefore, anchor reaction forces acting on the primary shoe and secondary shoe is received by this anchor section.

Due to the above structure, when the primary shoe and secondary shoe are expanded and pressed against the inner circumferential face of the drum, the anchor reaction force acting on the primary shoe is inputted into the entry side of the secondary shoe, so that the secondary shoe can be pressed against the inner circumferential face of the drum. Accordingly, both the primary shoe and the secondary shoe are made to act as leading shoes. Therefore, it is possible to obtain a brake force of very high gain.

Compared with a leading trailing type or a two leading type drum brake, the above duo-servo type drum brake can provide a very high brake force, and further it is easy to reduce the dimensions of the drum brake and furthermore it is easy to incorporate a parking brake into the drum brake. In this way, the above duo-servo type drum brake has a large number of advantages.

However, the above duo-servo type brake device is sensitive to a change in the coefficient of friction of the brake shoe lining. Accordingly, there is a tendency that the brake force is difficult to be stabilized. Therefore, it is required to take countermeasure for stabilizing the brake force.

In view of the above background, the present applicant has already proposed a shoe drive mechanism characterized in that: a valve for controlling hydraulic pressure is incorporated into a hydraulic wheel cylinder for expanding and contracting a pair of brake shoes, and a brake force is stabilized by controlling a supply of hydraulic pressure to the wheel cylinder according to an anchor reaction force.

However, the brake function of the brake devices incorporated into recent vehicles has been made to be highly intelligent, for example, an anti-lock brake is provided and also a traction control system is provided in the brake function of the brake devices. Further, from the viewpoint of reducing environmental pollution, electric vehicles (EV vehicles) and hybrid vehicles have been actively developed. In order to cope with the above intelligent brake function of the brake and also in order to cope with the electric vehicles, it is the most important task to drive the brake device electrically.

In order to drive the brake device electrically, for example, instead of the conventional hydraulic type wheel cylinder, an electrically driven type operating force generator, in which an electric motor and others are used, is adopted. In this case, it is impossible to use the above shoe drive mechanism in which the supply of hydraulic pressure to the hydraulic type wheel cylinder is controlled by the hydraulic control valve according to the anchor reaction force. Therefore, it becomes necessary to develop a new shoe drive mechanism adapted to the electrically driven type operating force generator, which is a new task to be accomplished when the duo-servo type brake drum device is electrically driven.

Therefore, as a shoe drive mechanism adaptable to the electrically driven type operating force generator, there is proposed a link mechanism for transmitting an output of the operating force generator to a pair of brake shoes. Concerning the conventional link mechanism, in general, the number of parts is large, and further it is necessary to incorporate an operating force generator for driving the shoe drive mechanism according to the brake operation. Accordingly, a space to be utilized between the pair of brake shoes is reduced.

Therefore, for example, when a parking brake mechanism is incorporated, if the parking brake mechanism has a complicated structure composed of a large number of parts, the manufacturing cost is increased, and further it is impossible to ensure a sufficiently large space into which the parts are incorporated. Accordingly, it becomes difficult to incorporate the parking brake mechanism into the brake device.

SUMMARY OF THE INVENTION

The present invention has been accomplished in view of the above circumstances. It is an object of the present invention to provide a parking brake mechanism in a drum brake, the number of parts of which is small, into which a drum brake having a link type shoe drive mechanism can be easily incorporated so that the productivity can be enhanced and the manufacturing cost can be reduced.

In order to accomplish the above object, the present invention provide a shoe drive mechanism of a drum brake, the drum brake being a duo-servo type drum brake comprising: a link type shoe drive mechanism in which a shoe operating force applied to an input lever is transmitted to a primary shoe and a secondary shoe, which are arranged in a drum space being opposed to each other, so that the brake shoes are pressed against the drum and at the same time a pushing force of each brake shoe to the drum is controlled according to an anchor reaction force acting on an anchor pin; and an operating force generator used for the service brake for applying a shoe operating force to the input lever via a swinging lever swung according to braking operation, wherein the parking brake mechanism is provided with a parking lever pivotally supported by either of the brake shoes, and one end of the parking lever is provided with a link drive section for transmitting a shoe operating force to the input lever in the case of swing of the parking lever, so that each brake shoe is pressed against the drum via the shoe drive mechanism when the parking lever is swung.

According to the above structure, the expanding operation of each brake shoe in the case of applying the parking brake is conducted via the link type shoe drive mechanism which is used for the service brake. Therefore, for the parking brake mechanism, it is unnecessary to provide exclusive parts for the mechanism to expand each brake shoe. Parts necessary for composing the structure are only a parking brake lever for inputting a shoe operating force into the shoe drive mechanism and a wire for manually operating the parking brake lever, that is, parts necessary for composing the structure can be kept at a minimum.

Accordingly, the parking brake mechanism can be relatively easily incorporated into a limited space between the pair of brake shoes. Therefore, the productivity can be enhanced and the manufacturing cost can be reduced by decreasing the number of parts composing the mechanism.

In the parking brake mechanism in a drum brake described above, it is preferable that the operating force generator includes a swinging lever penetrating a backing plate, one end of the swinging lever coming into contact with the input lever, the other end of the swinging lever protruding onto a reverse side of the backing plate, and also the operating force generator includes a wheel cylinder for swinging the swinging lever, arranged on the reverse side of the backing plate.

In the above structure, the wheel cylinder used for the operating force generator is arranged on the reverse face of the backing plate. Accordingly, a space between the pair of brake shoes capable of being used for the parking brake mechanism is increased. Therefore, the parking brake mechanism can be more easily incorporated into the drum brake, and the productivity can be more enhanced.

DETAILED DESCRIPTION OF THE PREFERRED EMBODIMENTS

Figure 1:
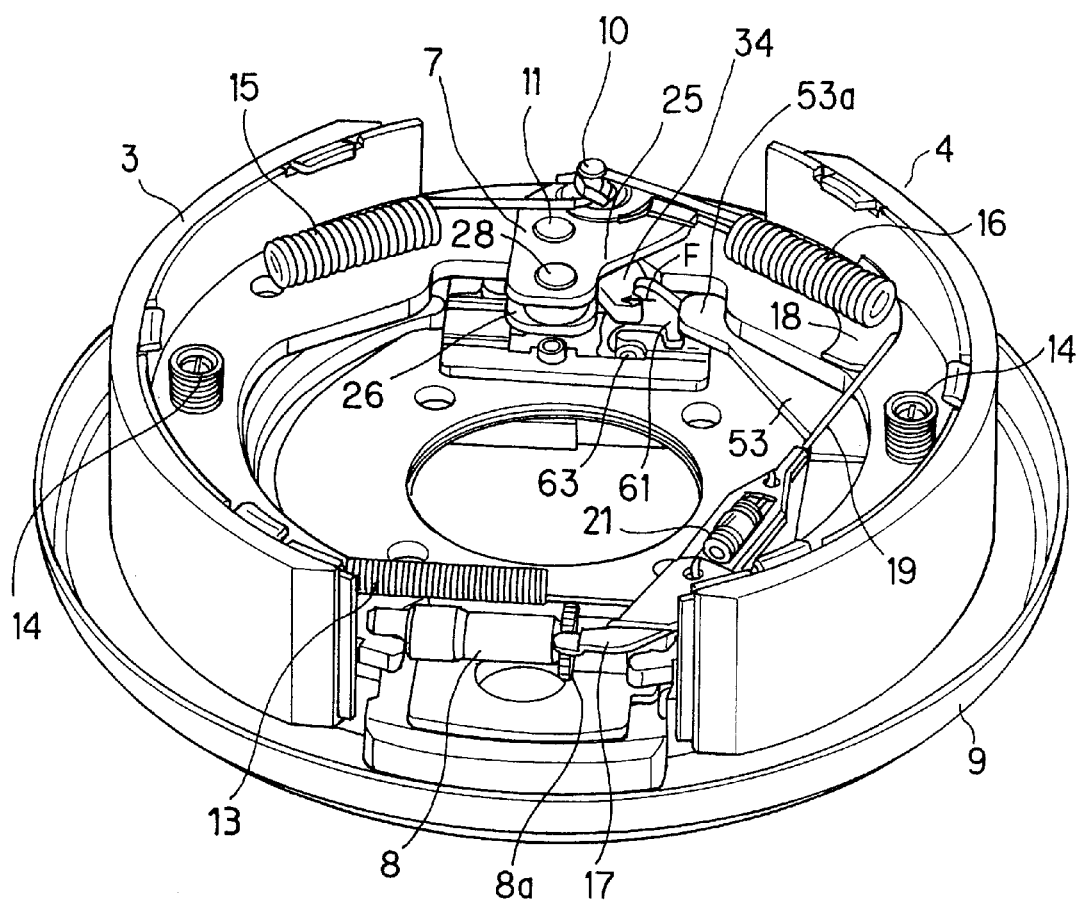
FIG. 1 is a perspective view of an embodiment of the drum brake into which the parking brake mechanism of the present invention is incorporated.

Referring to the drawings, a preferred embodiment of the parking brake mechanism in the drum brake of the present invention will be explained in detail as follows.

Figure 2:
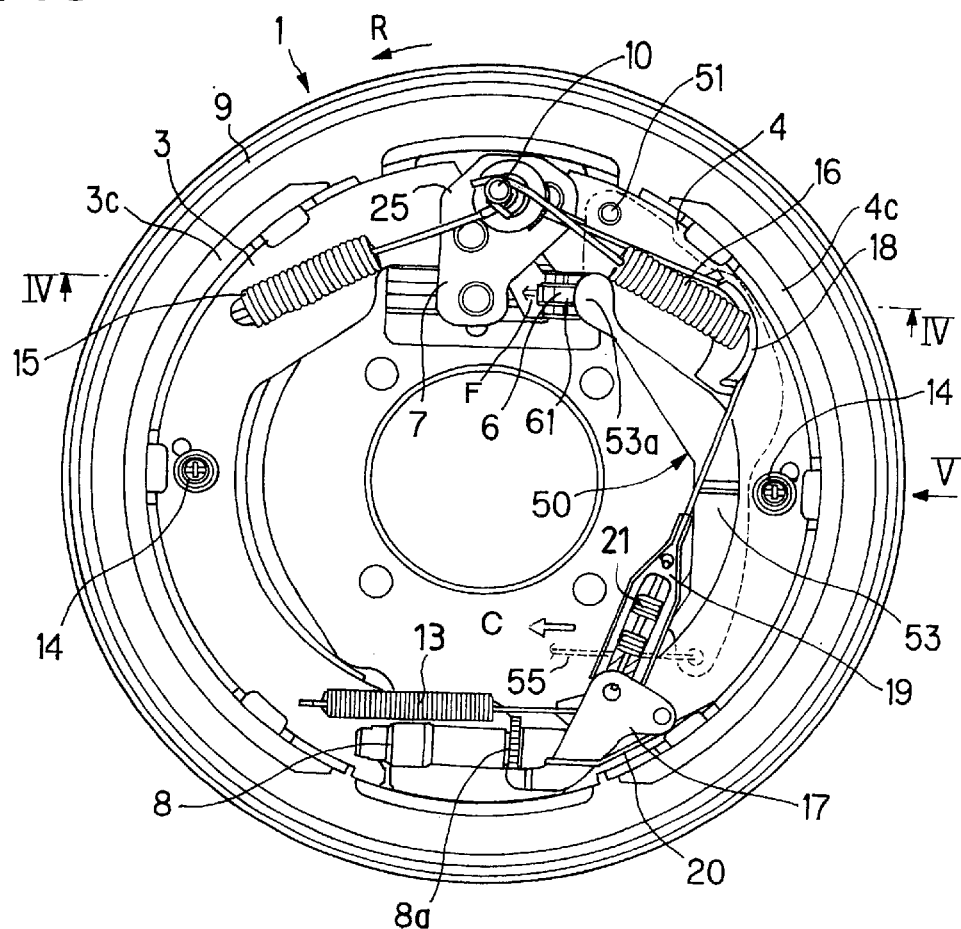
FIG. 2 is a front view of the drum brake shown in FIG. 1.
Figure 3:
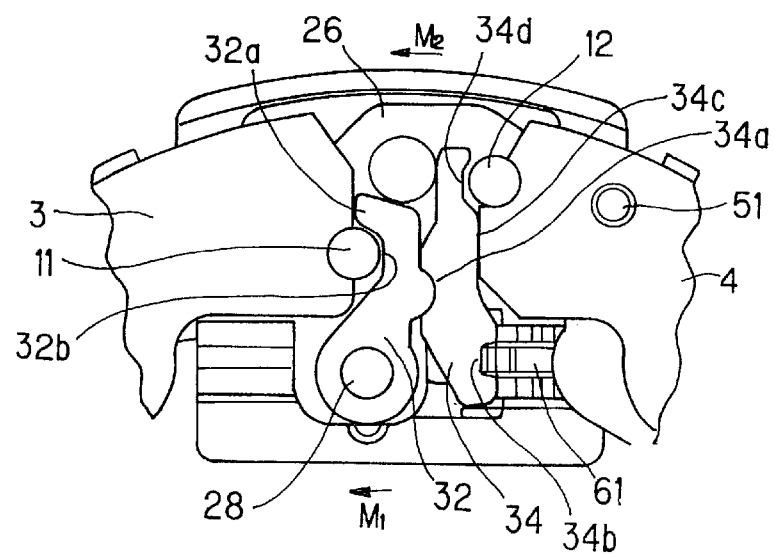
FIG. 3 is a partially enlarged view showing a state in which an upper base plate of the shoe drive mechanism shown in FIG. 2 is removed.
Figure 4:
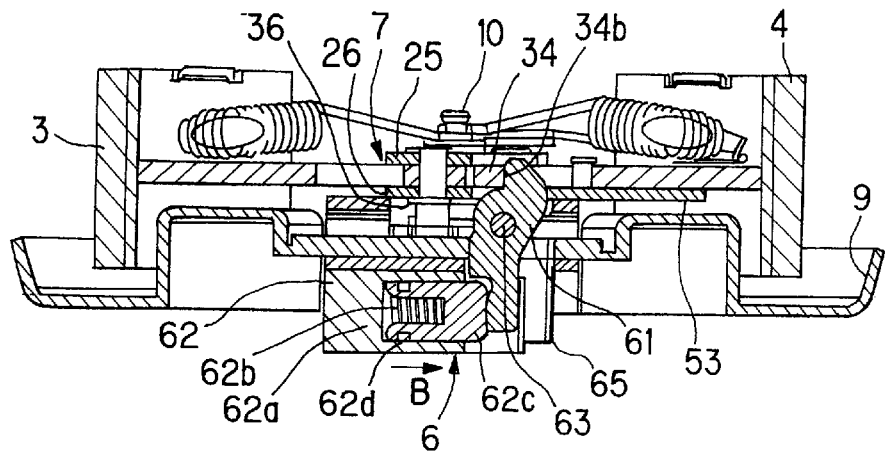
FIG. 4 is a cross-sectional view taken on line IV—IV in FIG. 2.
Figure 5:
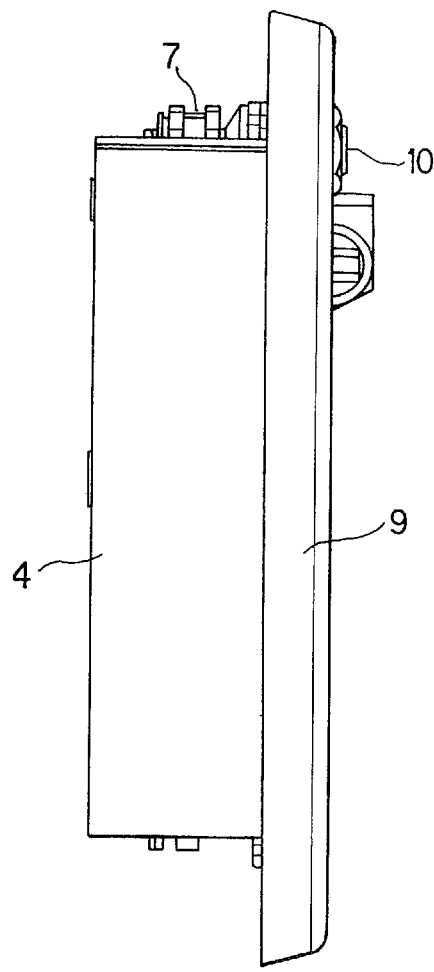
FIG. 5 is a view taken in the direction of arrow V shown in FIG. 2.

FIGS. 1 to 5 are views showing an embodiment of the parking brake mechanism in the drum brake of the present invention. FIG. 1 is a perspective view of the drum brake into which the parking brake mechanism of the present invention is incorporated; FIG. 2 is a front view of the drum brake shown in FIG. 1; FIG. 3 is a partially enlarged view showing a state in which an upper base plate of the shoe drive mechanism shown in FIG. 2 is removed; FIG. 4 is a cross-sectional view taken on line IV—IV in FIG. 2, and FIG. 5 is a view taken in the direction of arrow V shown in FIG. 2.

The drum brake 1 of this embodiment is what is called a duo-servo type drum brake. The drum brake 1 includes: a primary brake shoe 3 and a secondary shoe 4 which are arranged being opposed to each other in a space in a substantially cylindrical drum not shown; an operating force generator 6 arranged at one opposing end side of the pair of brake shoes 3, 4 and generating a shoe operating force to push the brake shoes 3, 4; a shoe drive mechanism 7 for transmitting the operating force generated by the operating force generator 6 to the brake shoes 3, 4; an adjuster unit 8 arranged between the other opposing end of the brake shoes 3, 4, also functioning as a link mechanism for inputting an output of the primary shoe 3 into the secondary shoe 4; a backing plate 9 for supporting these components; a main anchor pin 10 vertically arranged on the backing plate 9; and a parking mechanism 50 for providing a brake force by pushing the brake shoes 3, 4 to the drum when a vehicle is parked.

In this connection, the drum not shown is concentric with the backing plate 9. When the vehicle runs forward, the backing plate 9 rotates in the direction of arrow R in FIG. 2.

The above brake shoes 3, 4 are attached to the backing plate 9 by the shoe hold-down device 14 so that the brake shoes 3, 4 can be moved toward the inner circumference of the drum.

The end portions of the brake shoes 3, 4 on the operating force generator 6 side are connected with the main anchor pin 10 via the shoe return springs 15, 16 and respectively pushed in the directions in which the end portions of the respective shoes can approach each other, that is, the end portions of the brake shoes 3, 4 on the operating force generator 6 side are pushed in the directions so that the shoes can be separated from the drum.

The end portions of the brake shoes 3, 4 on the adjuster unit 8 side are pushed so that the end portions of the brake shoes 3, 4 can be always contacted with the end portions of the adjuster unit 8 by a resilient force of the adjuster spring 13.

As shown in FIG. 4, in this embodiment, the operating force generator 6 is arranged with inserted into the backing plate 9. The operating force generator 6 includes: a swinging lever 61, one end of which comes into contact with the input receiving section 34b of the input lever 34 of the shoe drive mechanism 7 and the other end of which is protruded from the reverse side of the backing plate 9; and a wheel cylinder 62 for driving the swinging lever 61 being attached onto the reverse side of the backing plate 9. The swinging lever 61 is pivotally attached to the backing plate 9 via the middle portion of the swinging lever 61.

Concerning the wheel cylinder 62, when the hydraulic fluid chamber 62b in the cylinder body 62a receives hydraulic pressure generated by a master cylinder according to the brake operation, the piston 62c slidably held in the cylinder body 62a proceeds in the direction of arrow B, so that the swinging lever 61 is rotated counterclockwise round the pin 63 in FIG. 4.

In FIG. 4, reference numeral 62d is a seal member for sealing a sliding section between the piston 62c and the cylinder body 62a. The backing plate 9 is provided with a boot 65, which covers the periphery of an inserting section of the swinging lever 61 so as to prevent foreign objects from intruding through the inserting section.

Originally, the adjuster unit 8 is provided for the object of adjusting an interval between the end portions of the brake shoes 3, 4 according to the wear of the linings 3c, 4c of the brake shoes 3, 4. Therefore, the adjuster unit 8 is composed so that the interval between the end portions of the brake shoes 3, 4 can be automatically adjusted by the rotational motion of the adjuster lever 17 which comes into contact with the adjusting gear 8a provided in the adjuster unit 8.

The adjuster lever 17 is connected with an end portion of the adjuster cable 19 which is connected with the main anchor pin 10 via the cable guide 18 attached to the secondary shoe 4.

When the brake is applied while the vehicle is being backed, the adjuster cable 19 applies a torque to the adjuster lever 17 via the over-travel spring 21 according to the movement of the secondary shoe 4, so that the adjuster lever 17 can be rotated by a predetermined rotation. The adjuster lever 17 is provided with a lever pushing spring 20 which pushes the adjuster lever 17 in the opposite direction to the pushing direction of the adjuster cable 19 and makes a forward end portion of the adjuster lever 17 come into contact with the adjusting gear 8a in the adjuster unit 8.

As shown in FIGS. 2 to 5, the shoe drive mechanism 7 includes: a pair of base plates 25, 26 pivotally engaged with the main anchor pin 10 vertically arranged on the backing plate 9; a secondary anchor pin 12 provided between the pair of base plates 25, 26 at a position appropriately distant from the inserting position of the main anchor pin 10 arranged on the base plates 25, 26 in the circumferential direction of the drum, the secondary anchor pin 12 being applied an anchor reaction force from the secondary shoe 4 when the brake is applied while the vehicle is running forward; a lever support pin 28 provided between the base plates 25, 26 at a position distant from the inserting position of the main anchor pin 10 to the inside in the radial direction of the drum; a primary anchor pin 11 provided between the base plates 25, 26 at a position in the middle of the inserting position of the main anchor pin 10 and the lever support pin 28, the primary anchor pin 11 being applied an anchor reaction force from the primary shoe 3 when the brake is applied while the vehicle is being backed; and a switch lever 32 and input lever 34 which are arranged adjacent to each other between the pair of base plates 25, 26 via the anchor pins 11, 12 and the lever support pin 28.

Each of the primary anchor pin 11, secondary anchor pin 12 and lever support pin 28 is composed of a head section, the diameter of which is expanded, coming into contact with the upper base plate 25, and an axis section inserted into the upper 25 and the lower base plate 26. A lock ring 36 (shown in FIG. 4) for locking the pin so that it can not be drawn out from the lower base plate 26 is attached to the axis section. In this way, each pin is assembled. That is, the pair of base plates 25, 26 are connected with each other by the primary anchor pin 11, secondary anchor pin 12 and lever support pin 28 while the switch lever 32 and the input lever 34 are being interposed between the pair of base plates 25, 26.

As shown in FIG. 3, the base end of the switch lever 32 is pivotally engaged with the lever support pin 28, and the forward end portion of the switch Lever 32 is provided with the shoe contact section 32a which comes into contact with one end of the primary shoe 3, and further the intermediate side edge of the switch lever 32 on the primary shoe 3 side is provided with a pin contact section 32b with which the primary anchor pin 11 is capable of coming into contact.

As shown in FIG. 3, at one end of the input lever 34, there is provided an input receiving section 34b for receiving a shoe operating force from the swinging lever 61 of the operating force generator 6. At the other end of the input lever 34, there are provided a shoe contact section 34c coming into contact with one end of the secondary shoe 4 and a pin contact section 34d capable of coming onto contact with the secondary anchor pin 12. At the intermediate section of the input lever 34, there is provided an input transmitting section 34a which is pivotally engaged with the intermediate side edge of the switch lever 32 on the secondary shoe 4 side. Shoe operating force F (shown in FIG. 2) inputted from the operating force generator 6 is transmitted to the switch lever 32 and the secondary shoe 4.

The shoe drive mechanism 7 is operated as follows: When the brake is applied while the vehicle is running forward or the vehicle is being backed, the shoe operating force is inputted from the swinging lever 61 of the operating force generator 6 into the input lever 34 of the shoe drive mechanism 7. Then the input lever 34 starts rotating round the shoe contact section 34c or the input transmitting section 34a. Due to the swing of the input lever 34 conducted by the shoe operating force, the shoe contact section 32a of the switch lever 32 is made to come into contact with the primary shoe 3, and also the shoe contact section 34c of the input lever 34 is made to come into contact with the secondary shoe 4. Further, the pair of base plates 25, 26 are made to rotate round the main anchor pin 10, so that each brake shoe 3, 4 is pressed against the inner circumferential face of the drum and the brake force is generated.

When the brake force is generated while the vehicle is running forward, anchor reaction force Fα of the secondary shoe 4 acts on the secondary anchor pin 12 provided between the pair of base plates 25, 26. This anchor reaction force Fα makes angular moment $M_2$, the direction of which is opposite to the direction of angular moment $M_1$ acting on the base plates 25, 26 by the shoe operating force, act on the base plates 25, 26.

Therefore, when the anchor reaction force reaches a predetermined magnification with respect to the shoe operating force, angular moment $M_1$ acting on the base plates 25, 26 by the shoe operating force and angular moment $M_2$ acting on the base plates by the anchor reaction force are balanced with each other.

When the anchor reaction force exceeds the predetermined magnification with respect to the shoe operating force, angular moment $M_2$ acting on the base plates by the anchor reaction force overcomes angular moment $M_1$ acting on the base plates 25, 26 by the shoe operating force. Angular moment $M_3$, which is a difference between angular moment $M_1$ and angular moment $M_2$, reverses the base plates 25, 26, which are rotated round the main anchor pin 10, in the direction in which the rotation of the base plates 25, 26 resists the shoe operating force.

The rotation of the base plates 25, 26 conducted by this angular moment $M_3$ makes the primary anchor pin 11 come into contact with the pin contact section 32b of the switch lever 32 and also makes push-back force $W_1$ act on the switch lever 32 via the primary anchor pin 11, so that the input lever 34 can be pushed back in the direction in which the input lever 34 resists the shoe operating force. Therefore, this angular moment $M_3$ becomes a brake restricting force for reducing the action of the shoe operating force, and the pushing force of the primary shoe 3 to the drum can be reduced.

On the other hand, when the brake force is generated while the vehicle is being backed, an anchor reaction force of the primary shoe 3 acts on the primary anchor pin 11 provided between the pair of base plates 25, 26. This anchor reaction force Fβ, which acts on the primary anchor pin 11, makes angular moment $M_5$, the direction of which is opposite to the direction of angular moment $M_4$ acting on the base plates 25, 26 by the shoe operating force, act on the base plates.

Therefore, when the anchor reaction force reaches a predetermined magnification with respect to the shoe operating force, angular moment $M_4$ acting on the base plates 25, 26 by the shoe operating force and angular moment $M_5$ acting on the base plates 25, 26 by the anchor reaction force are balanced with each other.

When the anchor reaction force exceeds a predetermined magnification with respect to the shoe operating force, angular moment $M_5$ acting on the base plates by the anchor reaction force overcomes angular moment $M_4$ acting on the base plates by the shoe operating force. Angular moment $M_6$, which is a difference between angular moment $M_4$ and angular moment $M_5$, reverses the base plates 25, 26, which are rotated round the main anchor pin 10, in the direction in which the rotation of the base plates 25, 26 resists the shoe operating force.

The rotation of the base plates 25, 26 conducted by this angular moment $M_6$ makes the secondary anchor pin 12 come into contact with the pin contact section 34d of the input lever 34 and also makes push-back force $W_2$ act on the input lever 34 via the secondary anchor pin 12. This push-back force $W_2$ swings the input lever 34 round the input transmitting section 34a and pushes back the input receiving section 34b of the input lever 34 in the direction in which the input receiving section 34b resists the shoe operating force. Therefore, this angular moment $M_6$ becomes a brake restricting force for reducing the action of the shoe operating force, and the pushing force of the secondary shoe 4 to the drum can be reduced.

As described above, in the aforementioned shoe drive mechanism 7, in either of the case in which the brake is applied while the vehicle is running forward or the case in which the brake is applied while the vehicle is being backed, when anchor reaction force $F\alpha$ or $F\beta$, which acts on the secondary anchor pin 12 or the primary anchor pin 11 by the brake shoe 3, 4, exceeds a predetermined magnification with respect to the shoe operating force inputted into the input lever 34, a brake restricting force for reducing the action of the shoe operating force acts on the input lever 34, so that the pushing force of each brake shoe 3, 4 to the drum is restricted. Therefore, the brake can be highly efficiently and stably applied.

The parking brake mechanism 50 of this embodiment provided in the above drum brake 1 comprises: a parking lever 53 pivotally connected with the secondary shoe 4 via the pin 51; and a link drive section 53a coming into contact with the input receiving section 34b of the input lever 34 via the above swinging lever 61, the link drive section 53a being provided at one end of the parking lever 53.

An end portion of the parking lever 53 is connected with the parking brake operating section via the transmitting means 55 such as a wire. When the transmitting means 55 such as a wire is drawn in the direction of an arrow C in FIG. 2, the parking brake lever 53 is rotated clockwise round the pin 51. Due to the above rotation, the link drive section 53a pushes the swinging lever 61 of the operating force generator 6 to the input lever 34 side, so that a pushing force, which is a shoe operating force, is applied to the input lever 34 via the swinging lever 61. Therefore, the shoe drive mechanism 7 is driven and the brake shoes 3, 4 are pressed against the drum.

In the above parking brake mechanism 50, the expanding operation of the pair of brake shoes 3, 4 in the case of applying the parking brake is conducted via the link type shoe drive mechanism 7 used for the service brake. Accordingly, for the parking brake mechanism, it is not necessary to provide exclusive parts to expand the pair of brake shoes. Therefore, the necessary parts composing the parking brake mechanism are the parking lever 53 for inputting a shoe operating force to the shoe drive mechanism 7, and the transmitting means 55 such as a wire for manually operating the parking lever 53, that is, the necessary parts composing the parking brake mechanism can be kept at a minimum.

Consequently, parts can be relatively easily incorporated into a limited space formed between the pair of brake shoes 3, 4. Therefore, it is possible to enhance the productivity, and the manufacturing cost can be reduced by decreasing the number of parts composing the brake device.

The operating force generator 6 of the above embodiment includes: a swinging lever 61 penetrating the backing plate 9, one end portion of which comes into contact with the input receiving section 34b of the input lever 34 and the other end portion of which protrudes onto the reverse side of the backing plate 9; and a wheel cylinder 62 for swinging the swinging lever 61 attached onto the reverse side of the backing plate 9. In the above structure, since the wheel cylinder 62 is arranged on the reverse side of the backing plate 9, it is possible to increase a space formed between the pair of brake shoes 3, 4 in which the parking brake mechanism is arranged. Therefore, the parking brake mechanism can be more easily incorporated, and the productivity can be more enhanced.

In the drum brake in which the parking brake mechanism 50 of the present invention is adopted, the specific structure of the operating force generator 6 for expanding the brake shoes 3, 4 and the shoe drive mechanism 7 is not limited to the above embodiment. It should be noted that the specific structure of the operating force generator 6 and the shoe drive mechanism 7 can be appropriately changed in the design without departing the scope of the present invention.

In the above parking brake mechanism of the drum brake of the present invention, the expanding operation of a pair of brake shoes in the case of applying the parking brake is conducted via the link type shoe drive mechanism used for the service brake. Accordingly, for the parking brake mechanism, it is not necessary to provide exclusive parts to expand the pair of brake shoes. Therefore, the necessary parts composing the parking brake mechanism are the parking lever for inputting a shoe operating force to the shoe drive mechanism, and the wire for manually operating the parking lever, that is, the necessary parts composing the parking brake mechanism can be kept at a minimum.

Consequently, parts can be relatively easily incorporated in a limited space formed between the pair of brake shoes. Therefore, it is possible to enhance the productivity, and the manufacturing cost can be reduced by decreasing the number of parts composing the brake device.

When the structure described is adopted, since the wheel cylinder used for the operating force generator is arranged on the reverse side of the backing plate, it is possible to increase a space formed between the pair of brake shoes in which the parking brake mechanism is arranged. Therefore, the parking brake mechanism can be more easily incorporated, and the productivity can be more enhanced.

What is claimed is:

1. A parking brake mechanism in a drum brake, the drum brake being a duo-servo type drum brake including: a link type shoe drive mechanism in which a shoe operating force applied to an input lever is transmitted to a primary shoe and a secondary shoe, which are arranged in a drum with being opposed to each other, so that the brake shoes are pressed against the drum and a pushing force of each of the primary shoe and the secondary shoe to the drum is controlled according to an anchor reaction force acting on an anchor pin; and an operating force generator for service brake for applying a shoe operating force to the input lever via a swinging lever swung according to a braking operation, said parking brake mechanism comprising:

a parking lever pivotally supported by one of the primary shoe and the secondary shoe, said parking lever including a link drive section provided at an end thereof for transmitting the shoe operating force to the input lever at the time of swinging said parking lever, wherein each of the primary shoe and the secondary shoe is pressed against the drum via the shoe drive mechanism when the parking lever is swung.

2. The parking brake mechanism in a drum brake according to claim 1, wherein the swinging lever is disposed with penetrating a backing plate, a first end of the swinging lever coming into contact with the input lever, a second end of the swinging lever protruding onto a reverse side of the backing plate, and wherein the operating force generator includes a wheel cylinder for swinging the swinging lever, arranged on the reverse side of the backing plate.

3. A duo-servo type drum brake comprising:

a drum;

a primary shoe disposed in said drum;

a secondary shoe disposed in said drum and opposing to said primary shoe;

an input lever for receiving a shoe operating force;

an anchor pin for receiving an anchor reaction force;

a link type shoe drive mechanism controlling a pushing force of said primary shoe and said secondary shoe to the drum according to the anchor reaction force acting on said anchor pin;

an operating force generator for applying a shoe operating force to said input lever via a swinging lever swung according to a braking operation;

a parking brake mechanism including a parking lever pivotally supported by one of said primary shoe and said secondary shoe, the parking lever including a link drive section provided at an end thereof for transmitting the shoe operating force to said input lever at the time of swinging the parking lever, wherein each of said primary shoe and said secondary shoe is pressed against said drum via said shoe drive mechanism when the parking lever of said parking brake mechanism is swung.

4. The duo-servo type drum brake according to claim 3, wherein the swinging lever of said operating force generator is disposed with penetrating a backing plate of said drum brake, a first end of the swinging lever comes into contact with said input lever, and a second end of the swinging lever protrudes onto a reverse side of the backing plate, and wherein said operating force generator further includes a wheel cylinder for swinging the swinging lever, arranged on the reverse side of the backing plate.

* * * * *